United States Patent [19]

Olsen

[11] 4,242,834
[45] Jan. 6, 1981

[54] NESTABLE AND STACKABLE TRANSPLANTING SYSTEM

[75] Inventor: Robert C. Olsen, Streamwood, Ill.

[73] Assignee: Illinois Tool Works Inc., Chicago, Ill.

[21] Appl. No.: 86,546

[22] Filed: Oct. 19, 1979

[51] Int. Cl.³ .............................................. A01G 23/02
[52] U.S. Cl. .......................................... 47/73; 47/75; 47/78; 47/85; 47/86; 206/514; 206/562; 211/72
[58] Field of Search .................. 47/39, 66, 67, 73–78, 47/84, 85–87, 18; 211/74–76, 71, 72; 206/423, 505, 514, 515, 518, 519, 562, 563

[56] References Cited

U.S. PATENT DOCUMENTS

| | | | |
|---|---|---|---|
| 1,638,693 | 8/1927 | Hooks | 47/73 |
| 3,053,010 | 9/1962 | De Shazor | 47/66 |
| 3,055,543 | 9/1962 | Russo | 206/515 |
| 3,078,020 | 2/1963 | Boonstra | 47/39 X |
| 3,142,133 | 7/1964 | Brooks | 47/73 |
| 3,315,410 | 4/1967 | French | 47/66 |
| 3,542,210 | 11/1970 | Sorensen | 47/75 |
| 3,987,924 | 10/1976 | Uitz | 47/84 X |
| 4,031,832 | 6/1977 | Edwards | 47/73 X |
| 4,156,395 | 5/1979 | Edwards et al. | 47/86 |
| 4,192,096 | 3/1980 | Platt et al. | 47/77 X |

FOREIGN PATENT DOCUMENTS

| | | | |
|---|---|---|---|
| 2735225 | 4/1977 | Fed. Rep. of Germany | 47/13 |
| 2298935 | 1/1976 | France | 47/77 |
| 1039188 | 8/1966 | United Kingdom | 47/86 |
| 1511256 | 5/1978 | United Kingdom | 47/87 |

OTHER PUBLICATIONS

Anon. (Planter Ad) "Net Pot Propagation?" *Florist's Review* Aug. 17, 1978 Publisher, vol. & No. –unknown, p. 79.

Primary Examiner—James R. Feyrer
Attorney, Agent, or Firm—Thomas W. Buckman

[57] ABSTRACT

A planting system including a support tray, a plurality of interconnected sleeves, and a plurality of transplant frames adapted for insertion within each sleeve. Each assembly is configured so that a plurality of assemblies are nestable and stackable without jamming relative to each other. Each individual part and subassembly is also configured to be nestable in nonjamming relationship with other like parts or subassemblies.

9 Claims, 6 Drawing Figures

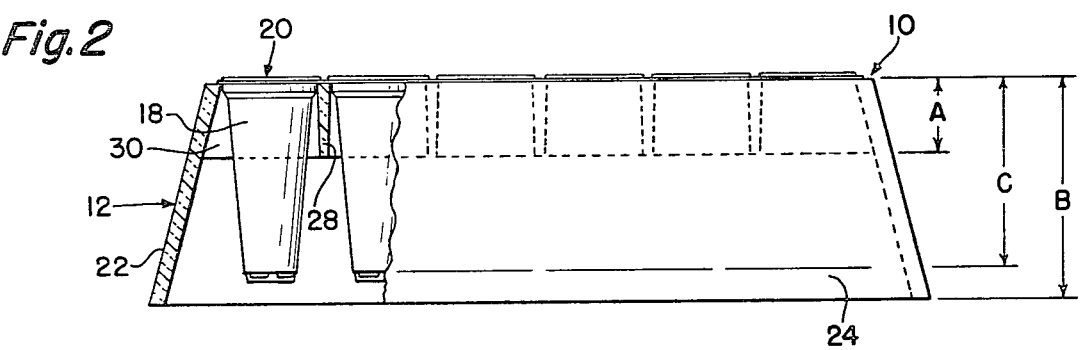
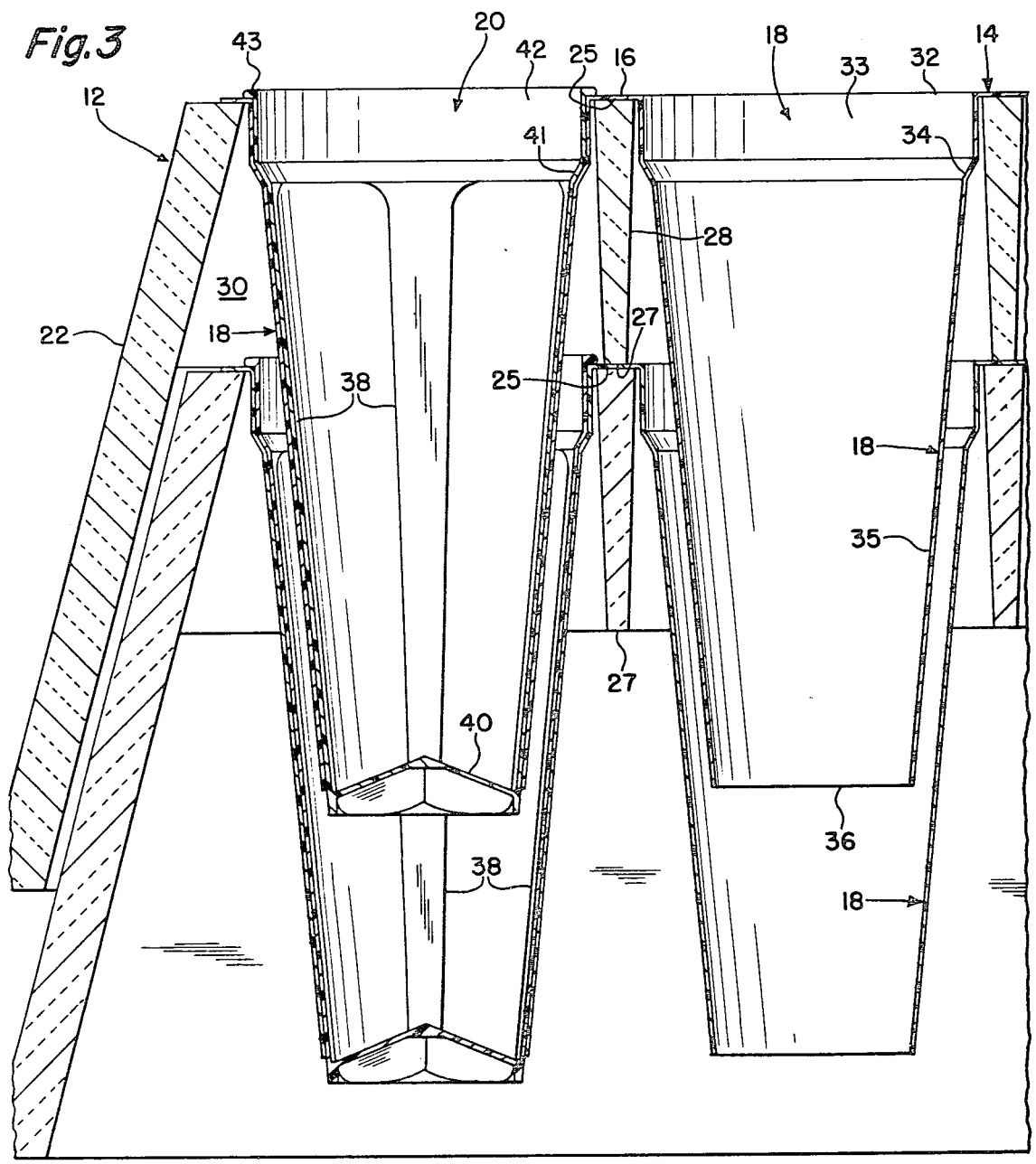

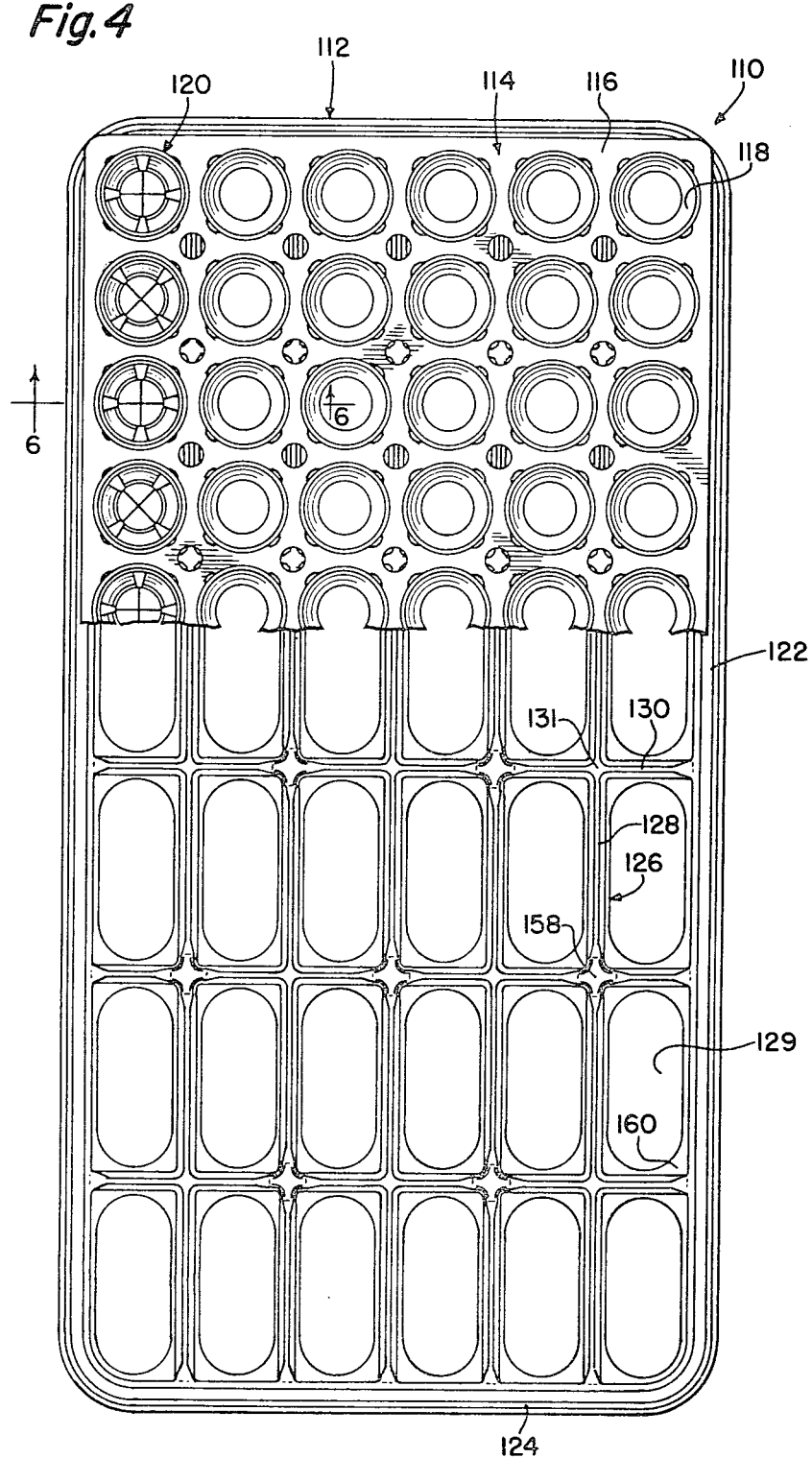

NESTABLE AND STACKABLE TRANSPLANTING SYSTEM

BACKGROUND AND SUMMARY OF THE INVENTION

The present invention relates generally to transplanting devices and assemblies which include such devices.

The invention more particularly relates to a system for use in the merchandising of small plants, as for example in greenhouses.

A currently typical manner of distributing small seedlings or plants, of the horticultural or agricultural variety, involves the use of a shallow plastic tray having a bottom and sidewalls extending upwardly from the bottom. A plurality of individual or separable containers, each having bottom and sidewalls, are positioned in the tray with the individual container bottoms resting on the bottom of the tray. Each of the individual containers is thus adapted to be filled with growing medium and a seed or seeds. A retail customer may then purchase either one or a plurality of such individual containers and will ultimately remove the contents for transplanting.

Since the individual containers are complete in and of themselves with a bottom wall, the necessary problems of such containers exist, such as J-rooting, drainage of water, etc. In addition to the plant growth problems inherent in such a system, it should be apparent that such a prior art system does not lend itself to efficient shipping or storage. The ultimate user, such as greenhouse operator or retailer, must handle a plurality of different items to achieve his desired objective of growing and efficiently displaying his plants. The trays of the prior art, while apparently nestable amongst themselves, cannot efficiently be shipped or stored with the plant containers therein. Thus, the greenhouse operator must handle the trays as well as the individual containers, both to fill them and to place them within the trays or flats.

As further background to this invention, broad reference is made to the planting system described in U.S. Pat. No. 4,031,832. While certain features of the system described in that patent, namely the use of a transplanting frame including ribs which is temporarily enclosed by a plastic sleeve placed over the ribs so that the bottom edge of the sleeve is spaced upwardly from the bottom wall of the frame, may be utilized by this invention. The patent does not include the stackability of assemblies or subassemblies reflected in this invention.

Accordingly, it is a primary object of the invention to provide a completely nestable and stackable transplanting system for use in greenhouses or the like.

A further object is to provide a transplanting assembly which includes a support tray particularly designed to accommodate a plurality of interconnected sleeves which form the walls for a container which container also may include transplanting frames wherein the assemblies themselves as well as the individual parts and subassemblies are all nestable and stackable.

Another object is to provide a system which expedites the filling of assemblies of transplantable containers by providing readily removable transplant frames in sleeves preassociated with the nestable and stackable trays.

It is a further object of the invention to provide a transplant system incorporating a low-cost, engineered support tray which permits a plurality of filled containers to be carried thereon so that the complete assemblies can be efficiently handled.

In order to satisfy the above objects and advantages, the preferred embodiments of the invention include a tray-like support element having sidewalls which diverge upwardly and inwardly from an open base to a grid-like upper structure. The upper structure is formed to include a plurality of longitudinal and laterally directed walls creating a plurality of apertures. The grid walls will be of a predetermined vertical dimension which is substantially less than the overall vertical dimension defined from the top of the grid to the open base of the tray.

A further aspect of the invention is the use of a web of thin plastic material formed to include a plurality of tapered sleeves. The apertures will receive the sleeves so that the top edges of the sleeves rest on the top surface of the grid structure with the lower regions of the sleeves supported freely from the grid. Complementary tapered transplanting frames will also preferably be associated with the tapered sleeves. The overall vertical dimension of the sleeve and frame is less than the overall vertical dimension of the tray but substantially greater than the vertical dimension of the grid wall portions so that when the assemblies are positioned in nesting arrangement the uppermost sleeve is telescoped within but spaced from a lowermost sleeve and frame combination. The lower edge of the grid in an upper assembly rests on the upper edge of the grid in a lower assembly permitting the two assemblies to be closely nested in nonjamming relationship relative to one another. Of course, it should be understood that many variations of this basic invention can be devised and one of the aspects of the invention is also the fact that any subcombination or individual elements of the above assembly can also be nonjammingly nested with similar subcombinations or individual elements.

Other objects and features of the invention will be apparent upon perusal of the hereinafter following detailed description read in conjunction with the drawings.

BRIEF DESCRIPTION OF THE DRAWINGS

FIG. 2 is an end elevational view of the tray in FIG. 1, partially broken away to show the containers nesting within the tray.

FIG. 3 is an enlarged sectional view of the assembly as taken along lines 3—3 of FIG. 1.

FIG. 4 is a top plan view of an alternate embodiment of the tray of the invention partially broken away to show the top of the tray both with and without sleeves and transplant frames.

DETAILED DESCRIPTION OF THE PREFERRED EMBODIMENTS

Figure 1:
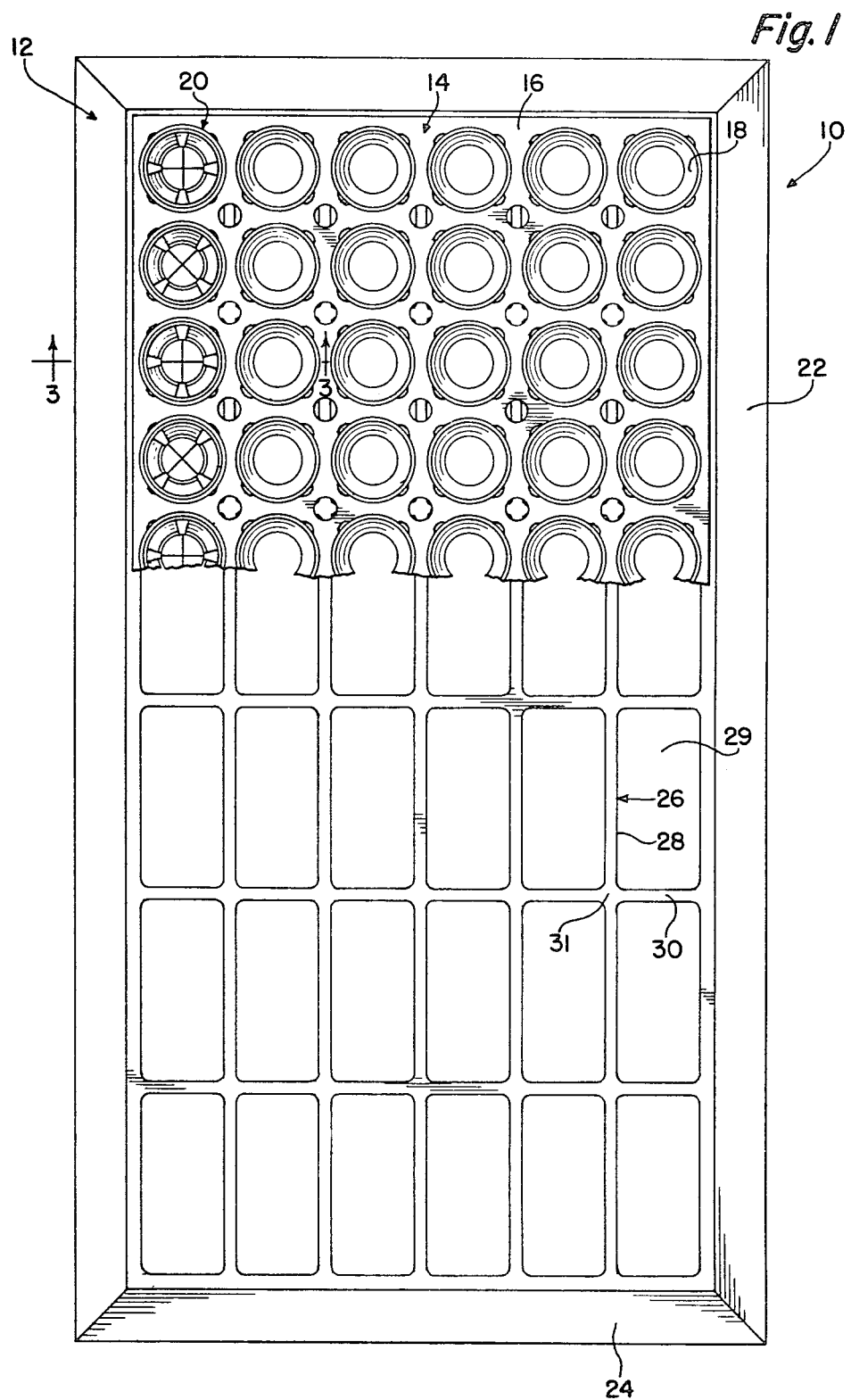
FIG. 1 is a top plan view of the assembly of the invention partially broken away to show the top of the support tray both with and without sleeves and transplant frames.

In FIGS. 1–3 one embodiment of the invention is shown wherein an assembly 10 includes three separate and separable entities, i.e. a tray support member 12, a thin plastic sheet 14, and a plurality of transplant frames 20 inserted into each of the sleeves. The sheet 14 includes a plurality of integral sleeves depending downwardly from a region resting on top of the tray. As will be described more in detail further, the assembly including these three parts is designed so that a plurality of such assemblies can be closely nested together and removed easily from one another.

Turning first to the tray 12, it will be shown to be rectangular and include four intersecting walls, i.e. two opposed end walls 24 and two longer opposed sidewalls 22. These walls will be inclined upwardly and inwardly from the open bottom of the support tray. A gridlike upper surface 26 basically includes a plurality of intersecting longitudinal vertical walls 28 and lateral vertical walls 30. These walls intersect at junctures 31 forming a plurality of elongated apertures 29, each of which receive, preferably, two sleeves 18 of the plastic sheet 14.

In the embodiment of FIGS. 1–3, the upper edge, or topmost surface 25, of the grid is coplanar with the upper edge of the walls. The vertical distance from the upper edge 25 to the lower edge 27 of the vertical wall being defined a first predetermined vertical distance which is substantially less than a second predetermined vertical distance defined between the upper edge of the side and end walls to the bottommost edge of the tray. In FIG. 2 these dimensions are respectively referred to as A and B. As an example of the representative dimensions of a tray that may effectively be utilized as a nonjamming, nestable, stacking tray, the angle of taper of the side and end walls may be, for example, 15° with relative dimensions of 1″ and 3″ respectively, for the above defined first and second vertical distances and rectangular dimensions of 9″×18″ for the grid. With such structural detail, a plurality of trays may be stacked one upon another so that the bottom edge 27 of the vertical grid wall in an upper tray abuts against the upper edge 25 of a corresponding grid wall in a lower tray. The width of the lower edge 27 may be less than the width of the upper edge 25 to abut without interference from the transplant frames.

A very thin gauge plastic sheet 14 is adapted to be positioned on the support tray so that webs or interconnecting regions 16 between integral sleeves 18 rest upon the grid upper surface 25. Each sleeve has an open top extremity 32 and an open bottom extremity 36, with a total vertical distance from the upper and lower extremities thereof being a third predetermined vertical dimension, referred to as C in FIG. 2. The sleeve, shown without a frame in the rightmost section of FIG. 3, basically includes an upper generally cylindrical wall section 33 of limited axial extent merging with an inwardly directed shoulder 34 with a gradually tapering sidewall section 35 extending from the innermost region of the shoulder to the lower opening 36. It should be apparent from FIG. 3 that a subassembly of a tray and plastic sheet can be closely stacked and nested upon one another without jamming either the tray or the sleeves.

In the preferred embodiments, the aperture 29 in the grid structure of the tray is elongated sufficiently to permit a row of two sleeves 18 to be positioned therein along the length of the tray.

In the complete assembly 10, a plurality of transplant frames 20 may be positioned in the sleeves 18 of plastic web. For example, the leftmost row of the sleeves in FIG. 1 and leftmost section of FIG. 3 show the frames positioned therein. Each transplant frame is constructed to be complementary to the sleeve in that the frame 20 includes an upper cylindrical ring portion 42 extending downwardly a limited axial distance from a radial lip or flange portion 43. The axial extent of the ring portion 42 should be consistent with the axial extent of the cylindrical wall 33 in a sleeve 18. An abutment shoulder 41 is formed in the frame extending inwardly from the lowermost extremity of the ring portion. A plurality of circumferentially spaced ribs 38 extend downwardly and inwardly from the lowermost region of the shoulder 41. These ribs terminate at, and are integrally connected to, a bottom wall 40 of the transplant frame, which is preferably upwardly domed. As taught in U.S. Pat. No. 4,031,832, the bottommost extremity of the sleeve 36 should be spaced upwardly slightly from the outer periphery of the bottom wall 40 of the frame. In this invention, this spacing is assured and maintained by the corresponding abutment surfaces 41 and 34 on the frame and sleeve respectively. Furthermore, the mating tapered regions of the frame and sleeve are nonjammed together when assembled due to the relationship between cylindrical surfaces 33 and 42 and abutment shoulders 34 and 41. Although not shown, it should be apparent that each individual frame 20 can, by virtue of the cylindrical ring section 42 and abutment shoulder 41, be nonjammingly nested relative to one another. In such a nested relationship, the uppermost edge 43 on a lower frame will rest against the abutment shoulder 41 on an upper frame in a series of nested frames.

Turning now to the complete assembly shown more clearly in FIG. 3 and with reference to FIG. 2, the novel relationship between the dimensions A, B and C is shown which will permit an assembly comprising of a tray 12 and a sheet having sleeves 18 with frames 20 positioned in the sleeves to be nested one on top of another. Since the dimension of the sleeve C is less than the dimension B of the height of the tray, the tray may be positioned on a support surface without interference to the bottom of the transplant containers. It is also important to note that the stacking of the lowermost edge 27 of the grid-like structure on an upper assembly on an uppermost edge 25 of the grid structure on a lower assembly permits the sleeves to be spaced from one another so that the outer surface of the sleeve does not contact the inner surface of the frames when in nested condition. Since the vertical dimension A of the grid walls 28 and 30 is of a limited dimension sufficient enough to keep the sidewalls of the tray from jamming, as well as the sleeves, the overall height of a stack of such assemblies is minimized. Furthermore, it should be noted that each assembly may retain its integrity when shipped and stored and may readily be disassociated from one another for filling and displaying and for eventual sale of individual frames or individual sleeves or a plurality of either.

While the embodiment described above, for strength purposes, is shown to be molded from thick-walled plastic, preferably a low-density cellular material, it should be noted that the tray need not be structured in such a manner but could be of a very thin-walled, blow-molded or thermo-formed plastic material.

Figure 5:
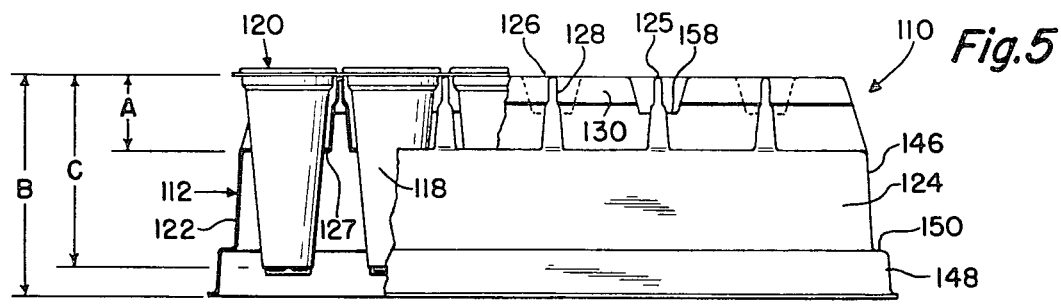
FIG. 5 is an end elevational view of the tray in FIG. 4 partially broken away to show the containers nesting within the tray.
Figure 6:
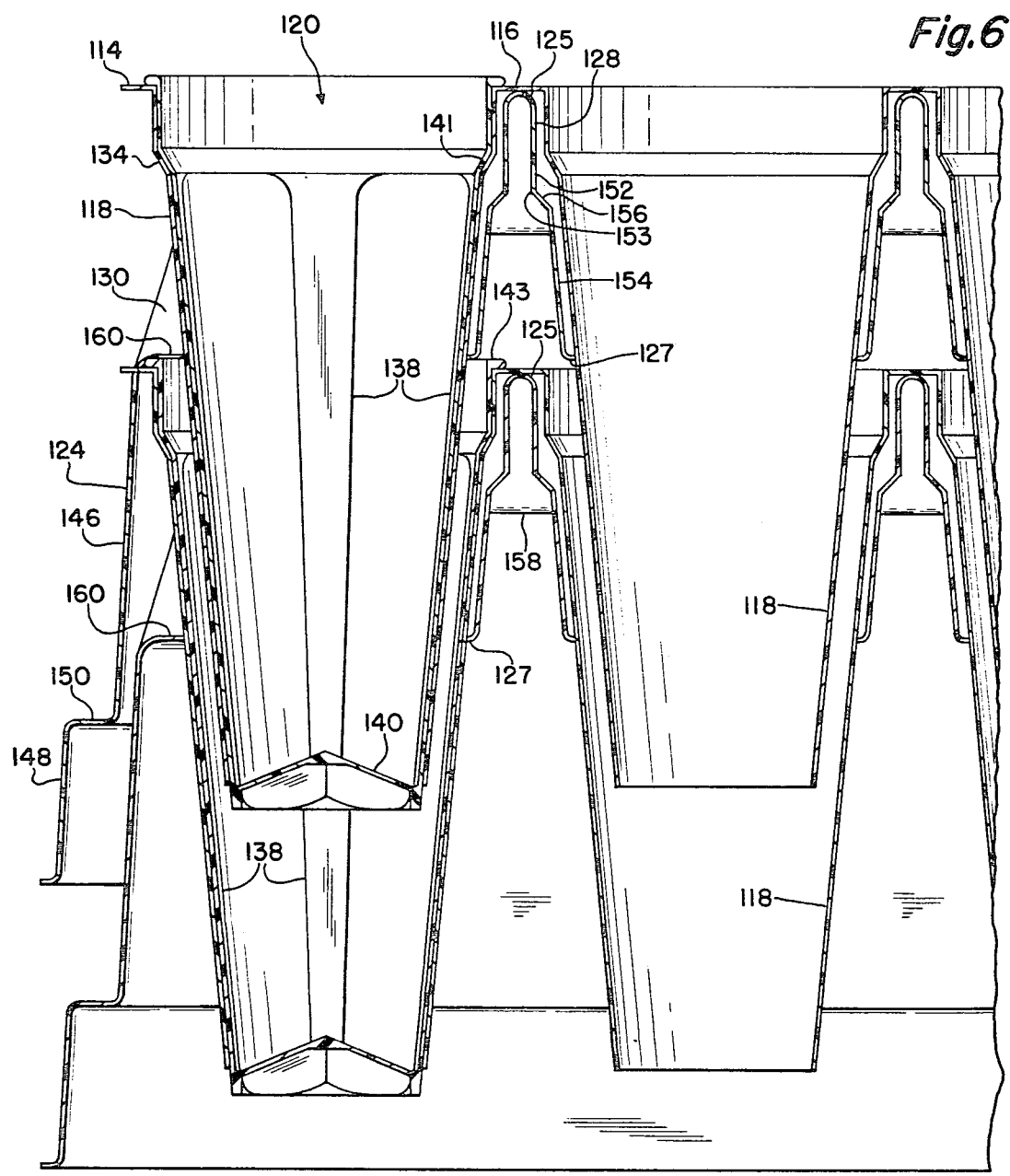
FIG. 6 is an enlarged sectional view of an assembly using the alternate embodiment of the tray and as taken along the lines 6—6 of FIG. 4.

Therefore, with reference to FIGS. 4–6, a system is described utilizing such a thin-walled support tray. In the embodiment described in these figures, the assembly 110 is generally similar to the above embodiment as indicated by the application of identical reference numerals, with the prefix "1" added thereto, to designate like or identical parts. Therefore, the assembly 110 will not be described in as great a detail as that of the assembly 10 above, particularly as it relates to the plastic sheet 114 and the transplanting frames 120 which remain identical to those shown in the first embodiment. However, certain distinctions between the tray 112 and the first-noted tray 12 will be described. For example, while the sidewalls and end walls 124 and 122 are tapered upwardly from the bottommost extremity of the tray, each of these walls is comprised of two different tapered sections. Upper sections 146 and lower sections 148 are interconnected by generally horizontal step regions 150. This step is not necessarily intended to serve as an abutment or stacking region but serves to strengthen the load bearing and handling capacity of the thin-walled tray. It should also be noted that the vertical extent of the sidewalls 124 do not extend to the topmost surface of the grid-like structure 126. Accordingly, the grid-like structure is comprised of a plurality of intersecting fin-like walls which are longitudinally and laterally directed substantially vertical walls 128 and 130, respectively. These walls are arranged in a plurality of cruciform-type elements with the longitudinal and lateral wall segments intersecting midway of their respective extremities at region 131. The cruciform portions of the grid are spaced from one another by a short shelf region 158 of limited planar area.

It should be noted that the vertical walls 128 and 130 may be described as generally V-shaped in cross section and are also distinguished by being comprised of upper and lower regions. For example, as shown clearly in FIG. 6, the upper region 152 of each of the walls 128 and 130 is essentially a pair of parallel thin walls interconnected at the top by an apex region 125. A lowermost outwardly tapered section 154 is joined to the upper section by a shoulder region 156. It should be noted that the shelf 158 is positioned approximately at the horizontal level of shoulder 156 on the grid walls. The shelf 158 strengthens the tray by separating the grid into several independent longitudinal and lateral beam sections. It should also be noted that when nesting one empty tray 112 with another, the mouth 153 of the parallel upper walls 152 nonjammingly stacks on the apex 125 of the upper walls of the grid.

The web 116 of the plastic sheet rests on the top of the apexes 125 of the grid-like structure in a manner substantially identical to assembly 10 described above. However, unlike assembly 10, the horizontal plane including the upper extremity of the sidewalls 124 and 122 also includes a generally horizontal shelf 160 which intersects the bottommost region of the vertical walls 128 and 130. This web shelf 160 creates an aperture 129 which receives, in a manner similar to the embodiment of FIG. 1, the sleeves 118. In this embodiment, the internal configuration of the aperture 129 may be elliptical to provide a lateral support for regions of the sleeves intermediate their extremities. In stacking arrangement, the bottommost regions 127 of the webs 160 rest on the top of the flange 143 of the planting frames. If the frames are not present, then the bottommost surfaces 127 rests upon the plastics web regions 116.

The various pluralities of sections in the grid-like structure provides strength to an otherwise thin and flexible tray. Other than the strengthening features, which are important to this embodiment, the structure and function of the tray is identical to the tray 12 shown in the first embodiment. For example, the vertical distances A, B, C as shown in FIG. 5 are identical in function and relative dimension to the dimensions described relative to the embodiment of FIG. 2.

While there has now been described an assembly of elements directed to a planting system, it should be apparent that the basics of the invention provide nestability and stackability for total assemblies as well as for individual parts in the assemblies. With this in mind, it should also be apparent that various alternatives and modifications to the invention can be made and it is not intended to limit the invention to the embodiments shown. On the contrary, it is intended to cover all alternatives, modifications and equivalents as may be included within the spirit and scope of the invention as defined by the appended claims.

I claim:

1. In an assembly adapted for growing a plurality of plants intended to be transplanted, a support tray configured for cooperation with a plurality of plant receiving sleeves integrally interconnected at their upper regions by web means, said support tray being a thin-walled plastic material having integral sidewalls, an open bottom, and grid-like upper structure, said sidewalls taper upwardly and inwardly from their lower edges, which define the perimeter of the open bottom, the grid-like structure comprising a plurality of longitudinal and lateral generally vertically directed wall means extending upwardly from a first horizontal plane which includes the upper extremities of the sidewalls, the plurality of longitudinal and lateral wall means defining, at least in part, a plurality of apertures through which plant receiving sleeves may be inserted, the vertical wall means being generally V-shaped in cross section and defining a first vertical dimension from the upper apex of the V-shaped cross section to the lowermost region of said vertical wall means which is at said first horizontal plane, the vertical distance from the lower edges of the sidewalls to the apex of the V-shaped cross section of said wall means defining a second predetermined vertical dimension, each vertical wall means including a pair of wall sections which are interconnected at the apex and laterally spaced at their intersection with said horizontal plane, the plant receiving sleeves depending downwardly from the web means and arranged in a pattern permitting the web means to be disposed on apices of the V-shaped cross sections with the sleeves depending between said vertical wall means, each of the sleeves having walls tapering downwardly and inwardly from the uppermost extremity to the lowermost extremity, the vertical dimension of each sleeve being substantially greater than said first predetermined vertical dimension and less than said second predetermined vertical dimension.

2. The support tray of claim 1, further defined as a thermoformed plastic device with substantially uniform wall thickness throughout.

3. The support tray of claim 1, wherein the side walls include a plurality of sections having similar angles of taper, the lowermost of the plurality of wall sections spaced slightly laterally outwardly from its associated uppermost section by a shoulder means.

4. The support tray of claim 1, wherein the vertically directed wall means include a first upper region extending downwardly from the apex of generally parallel wall sections, and a second lower region, including pairs of opposed and diverging wall sections from their upper extremity to their lower extremity.

5. The support tray of claim 1, wherein the grid-like structure comprises a plurality of cruciform shaped combinations of segments of said longitudinal and lateral vertical wall means, the longitudinal and lateral wall segments intersecting at their midpoints.

6. The support tray of claim 5, wherein at least the apex regions of adjacent cruciform combinations of vertical wall segments are spaced from one another both in the lateral wall direction and longitudinal wall direction.

7. The support tray of claim 6, wherein the adjacent cruciform combinations are interconnected by shelf means lying in a second horizontal plane spaced upwardly from the first horizontal plane but downwardly from a third horizontal plane which includes the apex regions of each vertical wall means.

8. The support tray of claim 1, wherein a plurality of circumferentially continuous ledge means equal in number to the plurality of aperture and forming the lower extremity for each aperture, said ledge means lying in said first horizontal plane, the inner periphery of each ledge means defining a predetermined closed configuration.

9. The support tray of claim 8, wherein the closed configuration of each ledge means is elliptical with the apex regions associated with each aperture defining an upper rectangular aperture.

* * * * *